(12) United States Patent  
Sharma et al.

(10) Patent No.: US 8,700,722 B1  
(45) Date of Patent: Apr. 15, 2014

(54) USER-AWARE CLOUD TO DEVICE MESSAGING SYSTEMS AND METHODS

(71) Applicant: Google Inc., Mountain View, CA (US)

(72) Inventors: Ashish Sharma, Sunnyvale, CA (US); Francesco Nerieri, Santa Cruz, CA (US); Doru C Manolache, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/844,286

(22) Filed: Mar. 15, 2013

(51) Int. Cl.
*G06F 15/16* (2006.01)

(52) U.S. Cl.
USPC .......................................... 709/206

(58) Field of Classification Search
None
See application file for complete search history.

(56) References Cited

U.S. PATENT DOCUMENTS

| | | | |
|---|---|---|---|
| 7,522,910 B2* | 4/2009 | Day | 455/412.1 |
| 2008/0301660 A1* | 12/2008 | Rao et al. | 717/170 |
| 2008/0301667 A1* | 12/2008 | Rao et al. | 717/172 |
| 2008/0301669 A1* | 12/2008 | Rao et al. | 717/173 |
| 2008/0301672 A1* | 12/2008 | Rao et al. | 717/177 |

* cited by examiner

*Primary Examiner* — Brian P Whipple

(74) *Attorney, Agent, or Firm* — Troutman Sanders LLP; James E. Schutz; Jay R. Anderson

(57) ABSTRACT

The disclosed technology covers messaging systems and methods, and computer program products embodying such systems and methods. An example computer-implemented method may include receiving, at a message server, a plurality of messages directed toward a plurality of computing devices, the plurality of messages including a first message directed toward a first user profile. A first computing device may be identified as being associated with the first user profile. It may be determined, by a computer processor, that the first user profile is inactive on the first computing device and that a second user profile is active on the first computing device. In that case, the first message may be held at the message server due to the first user profile being inactive. Other implementations of the messaging systems and methods are also disclosed herein.

20 Claims, 4 Drawing Sheets

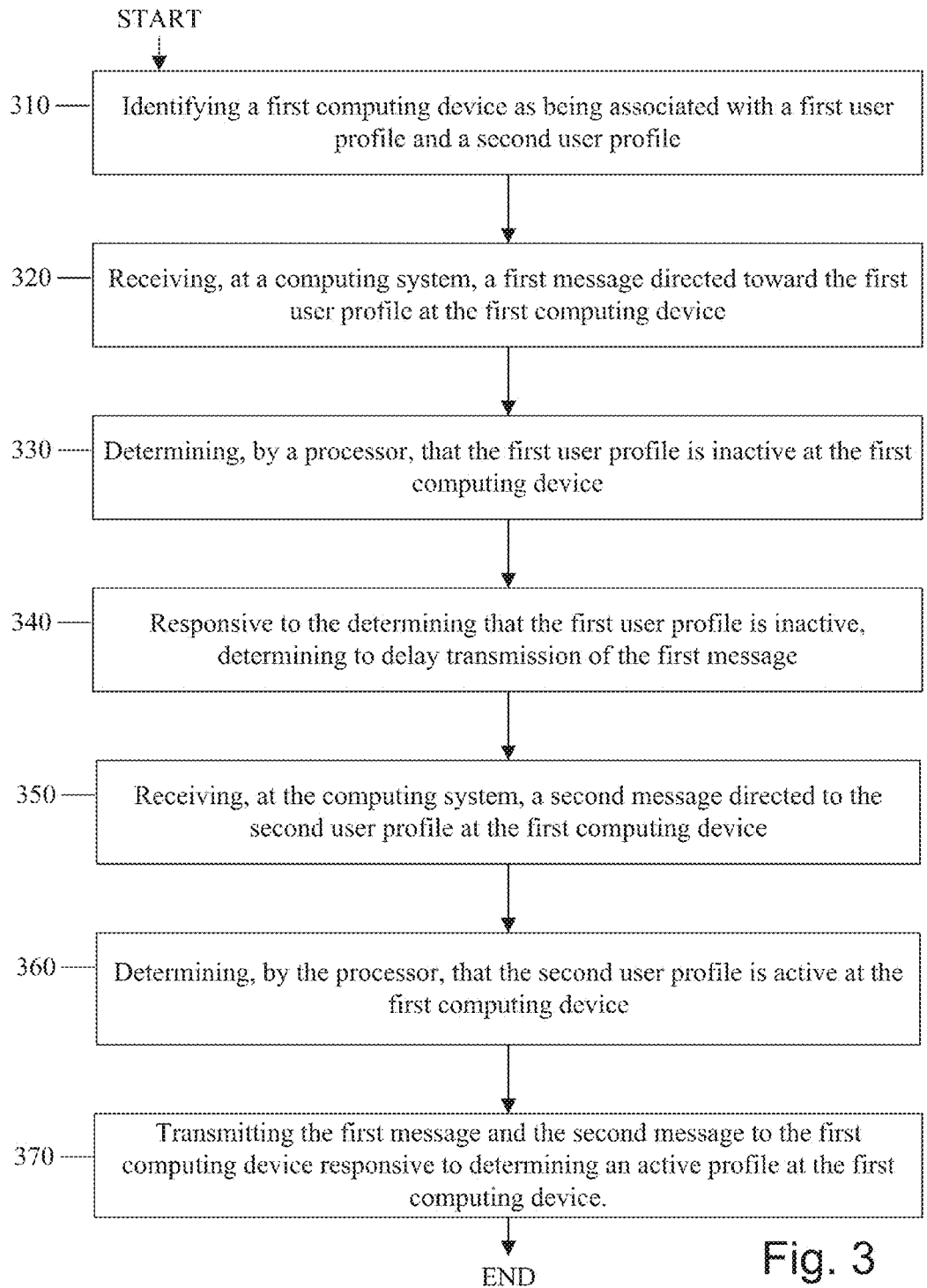

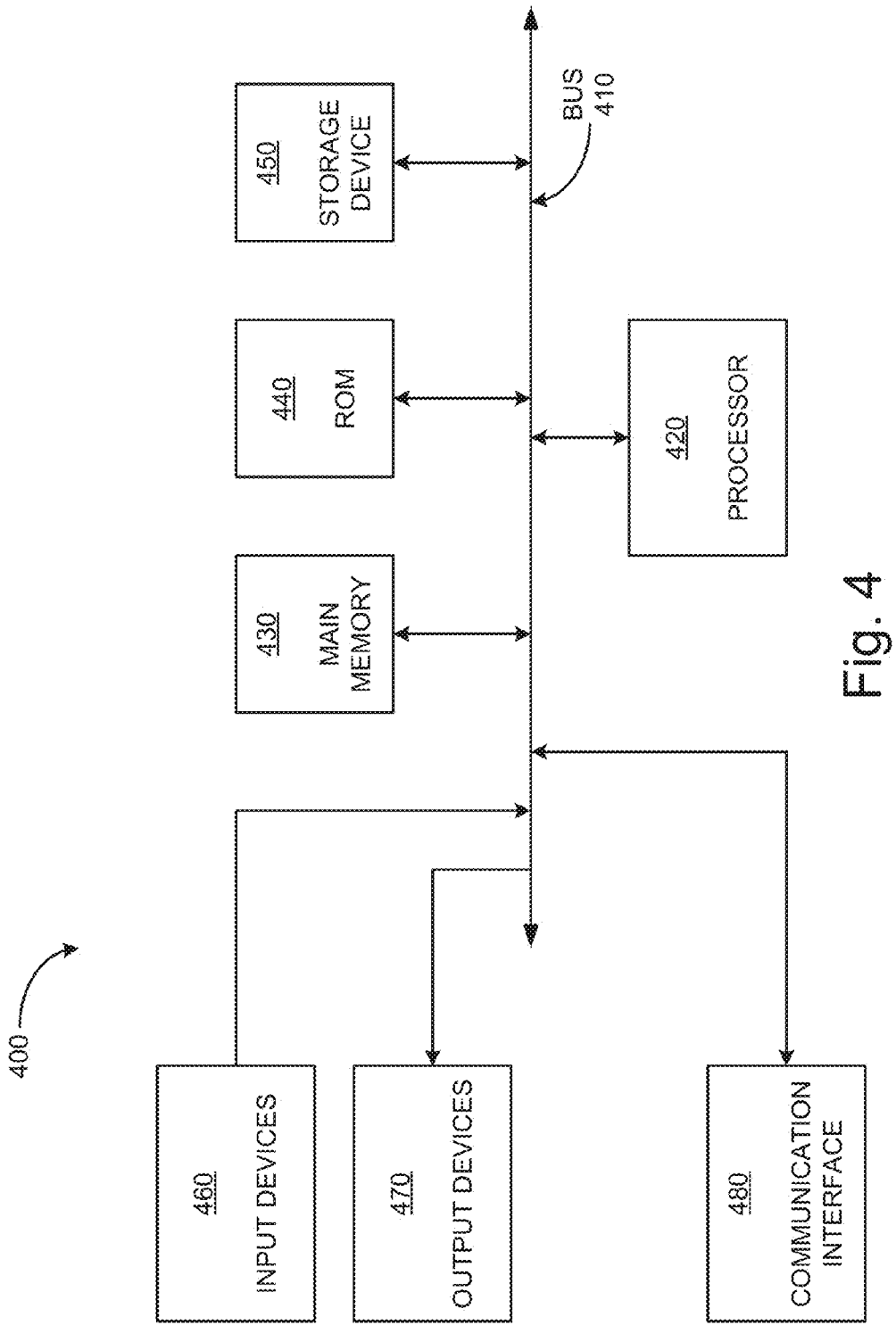

USER-AWARE CLOUD TO DEVICE MESSAGING SYSTEMS AND METHODS

BACKGROUND

Push notification services are in widespread use for sending messages to various computing devices, including mobile devices. For example, a push notification may be sent from a message server to a user's mobile device to notify the user of receipt of a new email message. Push services can reduce the required work of a mobile device by relieving the mobile device of the need to check continuously for new email or other new messages from remote servers.

In conventional mobile devices, only a single user profile is supported. As such, conventional message-delivery architecture supports a single connection between a mobile device and the message server. Push messages are generally delivered from the message server to the mobile device across this single connection, and then processed at the mobile device by the single user profile.

SUMMARY

Some or all of the above needs may be addressed by certain implementations of the disclosed technology. Certain implementations may include managing message delivery to computing devices with multiple user profiles, based at least in part on the status of those user profiles.

According to an example implementation, a method is provided. The method may include identifying a first computing device as being associated with a first user profile and a second user profile. A message server or other computing system may receive a first message directed toward the first user profile at the first computing device. It may be determined that the first user profile is inactive at the first computing device. Responsive to the determining that the first user profile is inactive, the first message may be stored for delayed transmission. A second message may be received at the computing system, the second message directed to the second user profile at the first computing device. After which, the first message and the second message may be transmitted the first computing device, responsive to determining, by the processor, that the second user profile is active at the first computing device.

According to another example implementation, a system is provided. The system may include a message server or other computing system in communication with a first computing device having a first user profile and a second user profile. The computing system may be operatively coupled to at least one processor. The at least one processor may be operatively coupled to at least one memory for storing data and instructions that, when executed by the at least one processor, cause the system to, receive, at the computing system, a first message directed toward the first user profile at the first computing device. The data and instructions may also cause the system to determine, by a processor, that the first user profile is inactive at the first computing device. Responsive to the determining that the first user profile is inactive, the first message may be stored for later transmission. A second message may be received at the messages server, after storing the first message, the second message directed toward the second user profile at the first computing device. The data and instructions may further cause the system to determine that at least one of the first user profile and the second user profile are active at the first computing device, and responsive to the determining that at least one of the first user profile and the second user profile are active, transmit, by the computing system, the first message and the second message to the first computing device According to yet another example implementation, a computer program product is provided. The computer program product may comprise a non-transitory computer-readable medium that stores instructions executable by one or more processors to perform a method. The method may include identifying a first computing device as being associated with a first user profile and a second user profile. A message server or other computing system may receive a first message directed toward the first user profile at the first computing device. It may be determined, by a processor, that the first user profile is inactive at the first computing device. Responsive to the determining that the first user profile is inactive, the first message may be stored for delayed transmission. A second message may be received at the computing system, the second message directed to the second user profile at the first computing device. After which, the first message and the second message may be transmitted the first computing device, responsive to determining, by the processor, that that either the first user profile or the second user profile is active at the first computing device.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 3 is a flow diagram of a method for managing message delivery, according to an implementation.

FIG. 4 is a diagram of an architecture of a computing system, according to an implementation.

DETAILED DESCRIPTION

Figure 1:
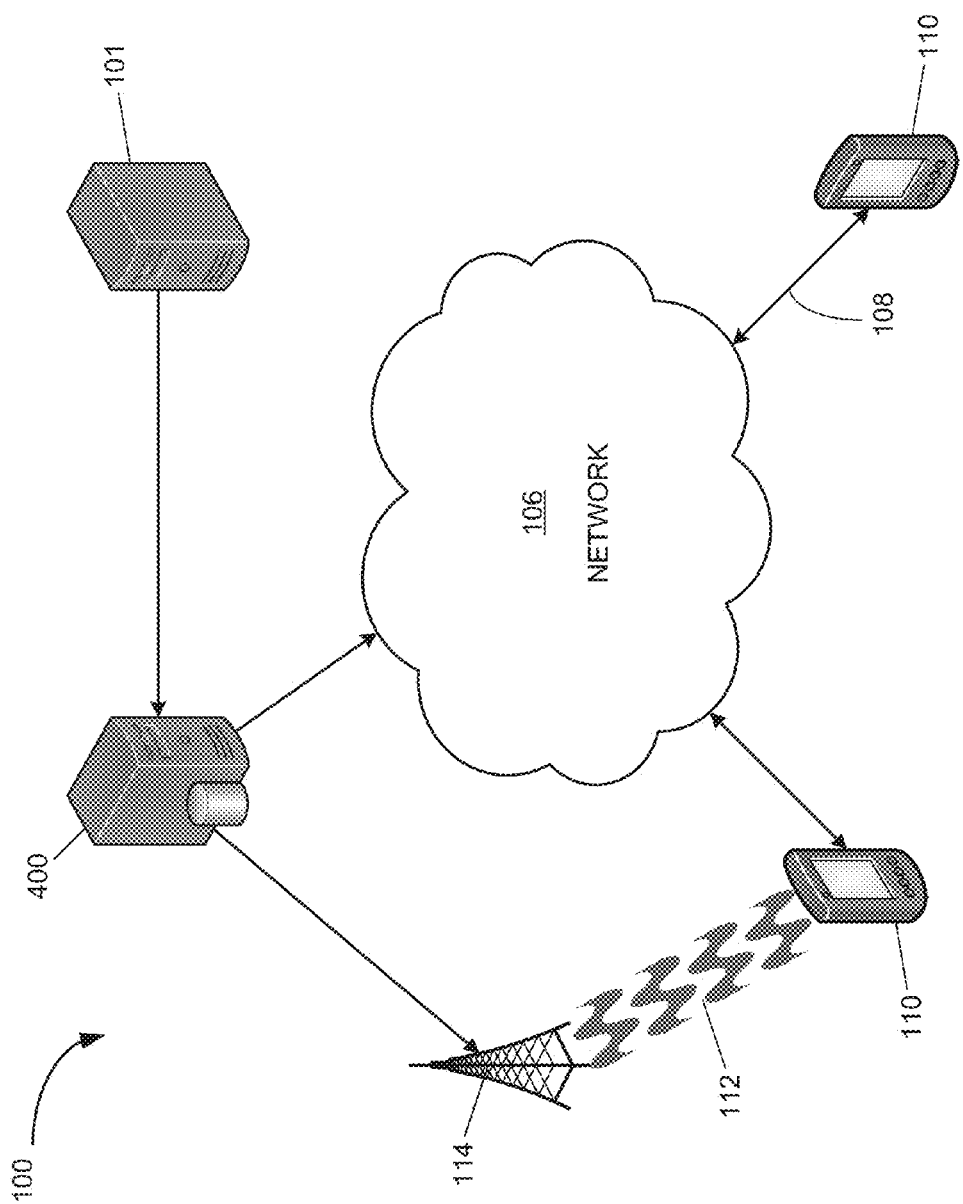
FIG. 1 is a block diagram of an illustrative messaging system according to an example implementation.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Many mobile devices currently use push messaging to receive data. A push message is data transmitted to the mobile device without prompting, or without the mobile device first having to check for messages. A message may be directed to a mobile device from, for example, an application server remote from the mobile device. In some instances, the message may be transmitted from the application server to a message server, which may manage message delivery for a plurality of mobile devices receiving push messages from a plurality of sources.

In conventional messaging systems, push messages are transmitted from the message server to the recipient mobile devices upon receipt of the messages at the message server. This generally occurs without purposeful delay. As a result, mobile devices receive their messages efficiently, without having to prompt the message server to determine whether messages are waiting. A drawback of conventional messaging systems is that transmitting messages requires turning on a radio of the mobile device, which may drain the battery.

A mobile device may have more than one user profile. Each user profile may represent a different user, or virtual user, of the mobile device. Each user may experience a different state of the user device, where that state is customized with the associated user's applications, preferences, or workspace arrangements. A first user having a first user profile on a mobile device may see a different set of applications than are seen by a second user having a second user profile on the same mobile device. In an example implementation, all or a portion of the second user's data in the second user profile may be inaccessible by the first user in the first user profile. In an example implementation, each user of a mobile device may have his own user name and password, and may be required to authenticate himself to the mobile device to access his user profile.

In a device with multiple user profiles, a particular user profile may be an active profile, a background profile, or a stopped profile. An active profile may be the user profile that is currently in use on the mobile device. A background profile may be a user profile that is not an active user but is running in the background and may therefore be able to receive messages. A stopped profile may be currently not running on the computing device, and thus may be unable to process commands. For the sake of this disclosure, user profiles that are not the active profile, but are instead either running in the background or stopped, will be referred to as "inactive" or in a "inactive" state. In some implementations, no more than a single user profile may be active on a computing device at a time.

Both active and background profiles may be currently running and able to process data on the mobile device. Since a background user profile is not active, however, it may be desirable purposely to delay command processing in some instances. Thus, there may be reduced urgency in delivering messages for background user profiles, as they are not currently in use by a user. Likewise, it may be beneficial to delay transmitting messages to stopped user profiles, as they cannot process those messages.

The existence of multiple user profiles can thus add considerations to the messaging system's role of managing message delivery. The disclosed technology recognizes that messages need not always be delivered immediately and, in some cases, cannot be delivered immediately. Because a mobile device has to wake up to receive messages, battery power may be preserved by delaying messages or sending messages in bulk. Accordingly, messaging system of the disclosed technology may temporarily hold messages at the message server if such messages are directed to inactive user profiles, and may transmit those messages only under certain conditions.

Various systems and methods may be utilized for managing message delivery to computing devices with multiple profiles, according to example implementations of the disclosed technology, and will now be described with reference to the accompanying figures.

FIG. 1 is a block diagram of an illustrative messaging system according to an example implementation. The messaging system 100 may be embodied, in whole or in part, in a message server 400 in communication with one or more application servers 101. The message server 400 may be or include a computer system, such as that illustrated in FIG. 4.

Referring to FIG. 1, the message server 400 may receive messages from the application server 101. The application servers 101 may be servers supporting applications installed on, or running on, the computing devices 110. The message server 400 may communicate the received messages by push messaging to various computing devices 110, such as a mobile device, desktop computer, or laptop computer.

It will be understood that there are numerous categories of computing devices 110 (e.g., mobile devices) with multiple user profiles that may benefit from implementations of the disclosed technology. For example, computing devices 110 may include, but are not limited to, portable computers, tablets, netbooks, e-readers, personal data assistants, ultra mobile personal computers, and smartphones.

The message server 400 may communicate with the computing device 110 in various ways. For example, the message server 400 may communicate with the computing device 110 through a Wi-Fi channel or another Internet connection 108, and may utilize a network 106 for communication with the computing device 110. For another example, the message server 400 may communicate to the computing device 110 through a service provider 114, such as a cellular service provider or other network provider supporting mobile devices. The service provider 114 may provide cellular service through cellular radio channels 112 for communicating with the computing device 110. In that case, the message server 400 may communicate or send messages to the computing device 110 through the service provider 114.

The message server 400 may be in communication with a plurality of computing devices 110 belonging to a plurality of users. One or more of these computing devices may have multiple user profiles, as discussed above. Further, the message server 400 may receive a plurality of messages for the various user profiles. The message server 400 may sort the received messages and associate each message with its intended-recipient user profile.

Instead of delivering all messages to the appropriate computing devices 110 of the user profiles immediately upon receipt, the message server 400 may batch certain messaging for future delivery, and may deliver other messages as soon as possible. More specifically, messages for active user profiles may be delivered as soon as possible, while messages for inactive user profiles may be held until one or more predetermined conditions are met.

It will be understood that a message need not be an email or a text message, but may alternatively be various types of data delivered to the computing device 110 as a transmission from a remote device. For example, and not limitation, an application server 101 may be associated with a weather application, and may transmit weather updates to the computing device 110. In another example, the application server 101 may be associated with an electronic mail application, and may transmit email messages to the computing device 110.

Figure 2:
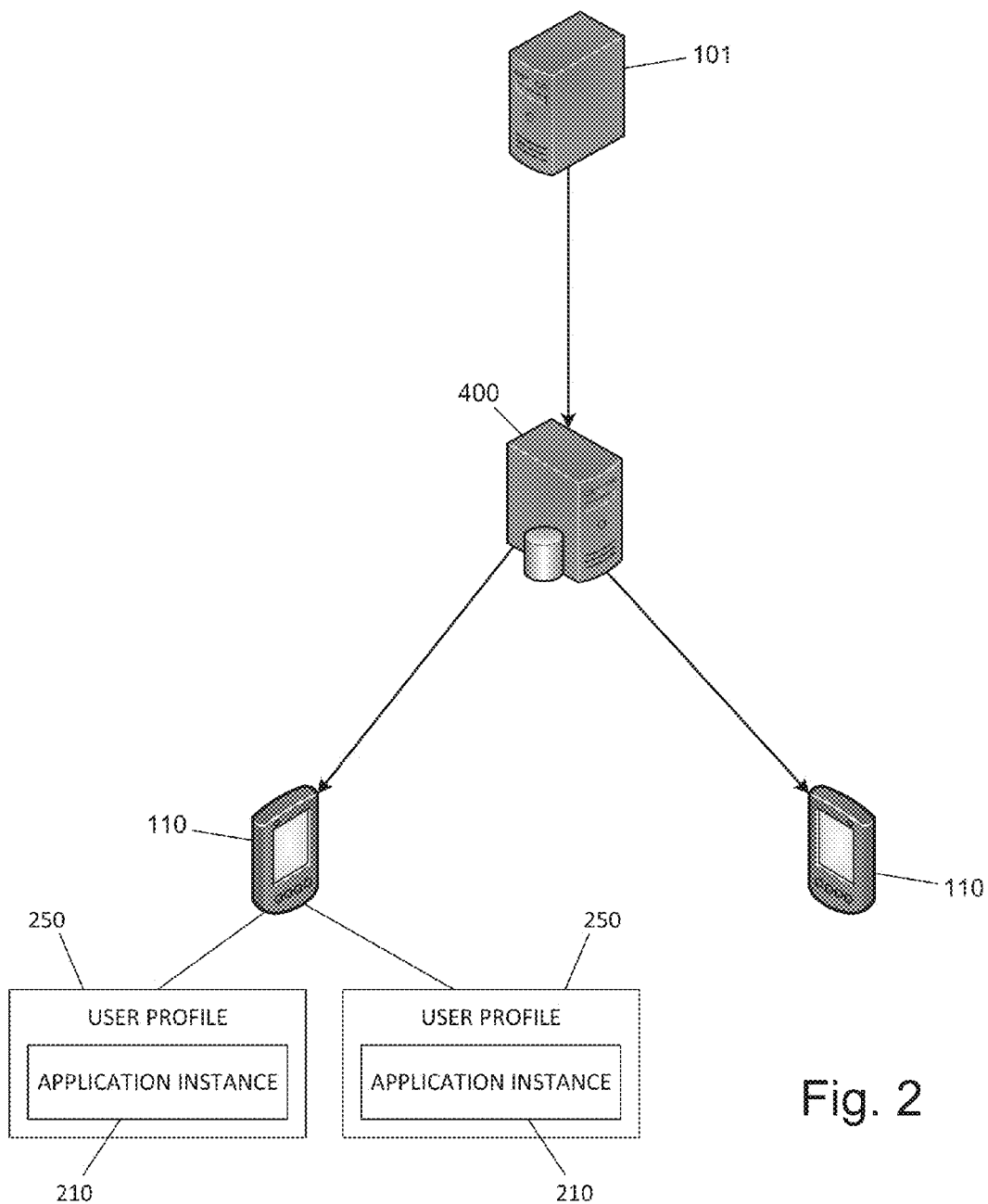
FIG. 2 is a bock diagram of the messaging system where multiple instances of an application exist on a mobile device, according to an implementation.

FIG. 2 is a bock diagram of the messaging system where multiple instances of an application exist on a mobile device, according to an implementation. As shown in FIG. 2, multiple instances 210 of a single application may run on a single computing device 110, where each application instance 210 is associated with a distinct user profile 250 on the computing device 110. Each application instance 210 running on a device may be independent of other application instances 210. In some implementations, this independence means maintaining separate application data for the application instances 210 of the various user profiles 250. From the view of the application server 101, each application instance 210, regardless of which computing device 110 runs that instance, registers with the application server 101 and has a unique registration identifier.

In some example implementations, the application server 101 is unaware of, or unconcerned with, the use of multiple user profiles 250 on the computing devices 110. The application server 101 may recognize application instances by their registration identifiers, and not by their particular computing devices 110. Further, in some implementations, the message server 400 may assign the registration identifiers and communicate them to the application server 101. In that case the registration identifiers can encode user identifiers, identifying the associated user profiles 210.

When the application server 101 desires to communicate with a particular instance 210 of its associated application, the application server 101 may transmit a message to the message server 400 indicating the registration identifier of the intended application instance 210. The message server 400 may receive the message from the application server 101, and may process the message for delivery.

The message server 400 may be aware of the user profiles on the various computing devices 110 with which it is in communication. The message server 400 may associate each computing device 110 with a device identifier, and may associate each user profile with a user identifier. It will be understood that, assuming each computing device 110 has at least one user profile 250, there will exist at least as many user identifiers as device identifiers. Further, each device identifier may be associated with one or more user identifiers, while each user identifier may be associated with only a single device identifier.

For each application server 101, the message server 400 may include, or otherwise have access to, data for translating the registration identifiers used by the application server 101 to user identifiers of user profiles 250 running the various application instances. For example, this data may be stored in a database, which may be implemented in various ways, and need not be limited to a relational database. When the message server 400 receives a message from the application server 101, including or accompanied by a registration identifier, the message server 400 may translate the registration identifier into the user identifier representing the user profile 250 running the application instance 210 represented by the registration identifier.

At this point, the message server 400 now has the message and may associate it with a user profile 250 and a computing device 110. Because a stopped user profile 250 is unable to receive messages, the message server 400 may hold messages for stopped profiles 250, and may deliver messages for running profiles 250. In some implementations, the message server may also, or alternatively, hold messages for background user profiles 250.

In an example implementation, the message server 400 may have access to status information related to the computing device 110. For example, and not limitation, this status information may be received at a communication interface 480 (FIG. 4) of the message server 400 from the various computing devices 110. Each computing device 110 may send information about its current state to the message server 400. The information may be sent either at the prompting of the message server 400 or, alternatively, autonomously by the computing device 110.

For example, and not limitation, the computing device 110 may send in its updates to the message server 400 information about its user profiles 250. More specifically, the computing device 110 may notify the message server 400 of any new user profiles 250, and may notify the message server 400 of one or more of the following: which user profiles 250 are running, which are active, which are in the background, and which are stopped. In some example implementations, the computing device 110 may provide updates in the form of changes since the prior update. In other words, the computing device 110 may indicate which user profiles 250 have switched their states, and the current states of such user profiles 250. Such updates may occur automatically when a change is made to a user profile 250 on the computing device 110.

Based on status information received from the various computing devices, the message server 400 may have access to information about the states of the various user profiles 250 across the computing devices 110. When a message is received from an application server 101, the message server 400 may determine, from the prior computing device updates, whether the intended-recipient user profile 250 is active. The message server 400 may temporarily hold messages, i.e., not transmit them to their intended recipients, until a predetermined condition is met. In some implementations, such predetermined condition may be the receipt by the message server 400 of a message directed toward an active user profile 250 on the same computing device 110.

In some implementations, when the message server 400 receives a message intended for an active user profile 250, the message server may transmit the message to the associated computing device 110 as soon as possible. When transmitting such message, the message server may also transmit other messages being held for background user profiles 250. These other messages may be batched together with the newly received message for the active user profile 250, and the batch may be transmitted to the computing device 110. As a result, the computing device 110 may be forced to awake only when a message for an active user profile 250 is received, but other messages may be received at the same time. Thus, battery and processor power of the computing device may be preserved, and messages may be received in a timely manner, as only messages for the active user profile 250 are needed right away.

Additionally, if messages are being held for a currently inactive user profile 250, and a new status update from the associated computing device 110 indicates that the user profile 250 is now active, then the held messages may be transmitted to the computing device. Such messages may be batched and delivered along with messages for background user profiles 250 as well.

Thus, the message server 400 may hold messages received for a particular computing device until one or more predetermined conditions are met, and such conditions may include (1) receipt of a message for an active user profile 250 on the computing device 110 and (2) receipt of indication that a user profile 250 for which messages are currently held has become active.

When the message server 400 transmits a batch of messages to a communication device 110, it may do so over one or more communication channels between the message server 400 and the communication device 110. Traditionally, only a single current network connection, and thus a single communication channel, exists between the message server 400 and the computing device 110 in question. According to an example implementation of the disclosed technology, if multiple user profiles are running, the computing device 110 or the message server 400 may initiate one or more additional connections between the message server 400 and the computing device 110, so that each user profile is associated with its own communication channel. Alternatively, if only a single connection between the message server 400 and the computing device 110 is maintained, the messaging system 100 may multiplex that connection.

To provide multiplexing, the message server 400 may associate or tag each message, during transmission to the computing device 110, with the user identifier of the intended-recipient user profile 250. This association may be implemented in various ways. For example, and not limitation, the message may be sent along with a separate message carrying the user identifier. Alternatively, the message server 400 may modify the message, such as a metadata portion of the message, to include the user identifier. As a result, the single connection between a computing device 110 and the message server 400 may behave as multiple connections, one for each user profile 250 on the computing device 110. When the computing device 110 receives the message, the computing device 110 may identify the user profile 250 for which the message is intended, based on encoding of the user identifier in or accompanying the message. That user profile 250 then captures and processes the messages.

FIG. 3 is a flow diagram of a method for managing message delivery, according to an implementation. As shown in FIG. 3, the method may include, at block 310, identifying a first computing device as being associated with a first user profile 250 and a second user profile 250; at block 320, receiving, at a computing system 400, a first message directed toward the first user profile 250 at the first computing device; at block 330, determining, by a processor 420, that the first user profile 250 is inactive at the first computing device; and at block 340, responsive to the determining that the first user profile 250 is inactive, determining to delay transmission of the first message; at block 350, receiving, at the computing system 400, a second message directed to the second user profile 250 at the first computing device; at block 360, determining, by the processor 420, that the second user profile 250 is active at the first computing device; and, at block 370, transmitting the first message and the second message to the first computing device responsive to determining an active profile at the first computing device.

It will be understood that the various steps shown in FIG. 3 are illustrative only, and that steps may be removed, other steps may be used, or the order of steps may be modified.

Various implementations of the messaging systems 100 and methods may be embodied in transitory or non-transitory computer readable media for execution by a computer processor. FIG. 4 is a diagram of an example architecture of a message server 400, in an implementation consistent with the disclosed technology. As shown, the message server 400 may include a bus 410, a processor 420, a main memory 430, a read only memory (ROM) 440, a storage device 450, one or more input devices 460, one or more output devices 470, and a communication interface 480. The bus 410 may include one or more conductors that permit communication among the components of the message server 400.

The processor 420 may be one or more conventional processors or microprocessors that interpret and execute instructions, such as instructions for providing aspects of the disclosed technology. The main memory 430 may include a random access memory (RAM) or another dynamic storage device that stores information and instructions for execution by the processor 420. The ROM 440 may include a conventional ROM device or another type of static storage device that stores static information or instructions for use by the processor 420. The storage device 450 may include a magnetic or optical recording medium and its corresponding drive.

The input devices 460 may include one or more mechanisms that permit an operator to input information to the message server 400, such as a keyboard, a mouse, a pen, voice recognition, or biometric mechanisms. The output devices 470 may include one or more mechanisms that output information to an operator, including a display, a printer, or a speaker. The communication interface 480 may include any transceiver-like mechanism that enables the message server 400 to communicate with remote devices or systems, such as a mobile device or other computing device 110 to which messages are delivered. For example, the communication interface 480 may include mechanisms for communicating over a network.

As discussed above, the message server 400 may manage message delivery to a plurality of computing devices 110. The message server 400 may perform tasks to that end in response to the processor 420 executing software instructions contained in a computer-readable medium, such as the memory 430. The software instructions may be read into memory 430 from another computer-readable medium, such as the data storage device 450, or from another device via the communication interface 480. Alternatively, or additionally, hard-wired circuitry may be used in place of or in combination with software instructions to implement processes consistent with the disclosed technology. Thus, the disclosed technology is not limited to any specific combination of hardware circuitry and software.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer-implemented method comprising:
   identifying a first computing device as being associated with a first user profile and a second user profile;
   receiving, at a computing system, a first message directed toward the first user profile at the first computing device;
   determining that the first user profile is inactive at the first computing device;
   responsive to the determining that the first user profile is inactive, determining to delay transmission of the first message;
   receiving, at the computing system, a second message directed to the second user profile at the first computing device; and
   transmitting the first message and the second message to the first computing device responsive to determining that the second user profile is active at the first computing device.

2. The method of claim 1, further comprising:
   providing a single network connection between the computing system and the first computing device; and
   multiplexing the single network connection to enable transmitting messages for the first user profile and for the second user profile through the single network connection.

3. The method of claim 2, further comprising:
   tagging the first message with a first identifier associated with the first user profile, before transmitting the first message and the second message to the first computing device; and
   tagging the second message with a second identifier associated with the second user profile, before transmitting the first message and the second message to the first computing device;
   wherein the first message and second message are transmitted over the single network connection.

4. The method of claim 1, further comprising receiving one or more status updates from the first computing device regarding statuses of user profiles at the computing device, the determining that the first user profile is inactive and the determining that the second user profile is active based on the one or more status updates.

5. The method of claim 4, wherein the one or more status updates includes a first status update indicating that the first user profile has become inactive at the first computing device, and wherein the determining that the first user profile is inactive is based on the first status update.

6. The method of claim 4, wherein the one or more status updates includes a first status update indicating that a user profile other than the first user profile has become active at the first computing device, and wherein the determining that the first user profile is inactive is based on the first status update.

7. The method of claim 4, wherein the one or more status updates includes a first status update indicating that the second user profile has become active at the first computing device, and wherein the determining that the second user profile is active is based on the first status update.

8. A system comprising:
   a computing system in communication with a first computing device having a first user profile and a second user profile;
   at least one processor operatively coupled to the computing system; and
   at least one memory operatively coupled to the at least one processor and configured for storing data and instructions that, when executed by the at least one processor, cause the system to:
     receive, at the computing system, a first message directed toward the first user profile at the first computing device;
     determine, by the at least one processor, that the first user profile is inactive at the first computing device;
     responsive to the determining that the first user profile is inactive, hold the first message in the at least one memory for later transmission by the computing system;
     receive, at the computing system, a second message after the determining that the first user profile is inactive, the second message directed toward the second user profile at the first computing device;
     determine that at least one of the first user profile and the second user profile are active at the first computing device;
     responsive to the determining that at least one of the first user profile and the second user profile are active, transmit, by the computing system, the first message and the second message to the first computing device.

9. The system of claim 8, the transmitting of the first message and the second message to the first computing device occurring over a single communication channel between the computing system and the first computing device.

10. The system of claim 9, wherein the instructions, when executed by the at least one processor, further cause the system to:
    tag, by the computing system and before the transmitting of the first message and second message to the first computing device, the first message with an identifier associated with the first user profile and tag the second message with an identifier associated with the second user profile.

11. The system of claim 8, wherein the instructions, when executed by the at least one processor, further cause the system to:
    receive, at the computing system, a first status update from the first computing device after receiving the second message, the determining that the first user profile is inactive at the first computing device based on the first status update.

12. The system of claim 11, the first status update indicating that the first user profile is inactive at the first computing device.

13. The system of claim 11, the first status update indicating that a user profile other than the first is active at the first computing device.

14. The system of claim 11, wherein the instructions, when executed by the at least one processor, further cause the system to:
   receive, at the computing system, a second status update from the first computing device after receiving the second message, the determining that at least one of the first user profile and the second user profile are active based on the second status update.

15. The system of claim 14, the second status update indicating that the first user profile is active at the first computing device.

16. The system of claim 14, the second status update indicating that the second user profile is active at the first computing device.

17. A computer program product comprising a non-transitory computer-readable medium that stores instructions executable by one or more processors to perform a method, the method comprising:
   identifying a first computing device as being associated with a first user profile and a second user profile;
   receiving, at a computing system, a first message directed toward the first user profile at the first computing device;
   determining that the first user profile is inactive at the first computing device;
   responsive to the determining that the first user profile is inactive, marking the first message for delayed transmission;
   receiving, at the computing system, a second message directed to the second user profile at the first computing device; and
   transmitting the first message and the second message to the first computing device responsive to determining that either the first user profile or the second user profile is active.

18. The computer program product of claim 17, the method further comprising:
   responsive to determining that the second user profile is inactive, marking the second message for postponed transmission.

19. The computer program product of claim 17, the method further comprising:
   tagging the first message with an identifier of the first user profile and
   tagging the second message with an identifier of the second user profile, before the transmitting of the first message and the second message.

20. The computer program product of claim 19, the method further comprising transmitting the first message and the second message to the first computing device over a single socket connection shared by the first user profile and the second user profile.

* * * * *